United States Patent [19]
Young

[11] Patent Number: 5,397,469
[45] Date of Patent: Mar. 14, 1995

[54] JUNK SEPARATOR FOR, AND IN COMBINATION WTIH, A PULP SLURRY INLET CHAMBER OF A PULP HANDLING MACHINE

[75] Inventor: Douglas L. G. Young, Nashua, N.H.

[73] Assignee: Ingersoll-Rand Company, Woodcliff Lake, N.J.

[21] Appl. No.: 69,814

[22] Filed: Jun. 1, 1993

[51] Int. Cl.6 .......................................... B01D 21/26
[52] U.S. Cl. .................... 210/304; 210/498; 210/499; 210/512.1; 162/384
[58] Field of Search ............ 210/498, 499, 304, 512.1; 162/55, 384

[56] References Cited
U.S. PATENT DOCUMENTS

| | | | |
|---|---|---|---|
| 1,615,071 | 1/1927 | Cobb | 210/498 |
| 1,788,383 | 1/1931 | Delery | 210/498 |
| 4,067,800 | 1/1978 | Young | 209/273 |
| 5,096,127 | 3/1992 | Young | 241/46.17 |

Primary Examiner—Robert A. Dawson
Assistant Examiner—W. L. Walker
Attorney, Agent, or Firm—Robert F. Palermo; Bernard J. Murphy

[57] ABSTRACT

In the floor of a pulp slurry inlet chamber an opening is provided. The opening is elongate and arranged substantially tangential to the outer, bounding wall of the chamber. Barriers of arcuate cross-section depend from the opening, at opposite ends of the opening. The barriers are incurvate, relative to the opening. The opening has a length across which junk cannot bridge. Consequently, the junk falls through the opening and is captured in an accumulator which underlies the opening. Knots substantially bridge across the opening, and impinge upon the arcuate barrier at the far end of the opening to be thrown upwardly for assimilation with the slurry flow coursing through the chamber. An elutriative liquid is supplied to the accumulator, at a given flow velocity, to wash up and out of the accumulator any organic particles which, due to irregularities, pass through the opening, to return the organic particles to the chamber.

10 Claims, 4 Drawing Sheets

JUNK SEPARATOR FOR, AND IN COMBINATION WITH, A PULP SLURRY INLET CHAMBER OF A PULP HANDLING MACHINE

BACKGROUND OF THE INVENTION

The present invention relates to the field of coarse or fine pulp screening systems, of which the purpose is to remove oversize, organic material for reprocessing.

Primary screens concentrate the oversize material into a reject stream which contains good fiber. A reject separator, then, typically recovers the good fiber from the reject stream and discharges fiber free, oversize material for reprocessing. However, the mainline pulp stream contains, also, junk (i.e., rocks, tramp material, gravel and, unwanted, organics) which, desirably, should be separated out and discharged as a unique, pulp-free flow for disposal. The aforesaid resulted in efforts to remove junk in primary screens by a centrifugal trap in an inlet chamber. However, partly due to the relatively higher, fluent consistency in this inlet chamber part of the system, this approach did not remove smaller particles, such as gravel, effectively, but it was successful mainly in removing large particles capable of jamming the primary screen. Smaller particles tended to carry over, to be discharged with the rejected, organic material.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by a junk separator, for a pulp slurry handling machine, which has a circular slurry inlet chamber with an annular bottom floor, comprising a discrete plate for forming a minor portion of the bottom floor of the inlet chamber. The plate includes an opening formed therein.

In another aspect of the invention, this is accomplished by a junk separator, in combination with a slurry inlet chamber of a pulp circular slurry handling machine, comprising a slurry inlet chamber having an outer peripheral wall, an annular bottom floor, and a slurry inlet conduit. The floor is imperforate, save for a single circular aperture formed in a minor portion thereof, and a discrete plate set in the aperture. The plate has an elongate opening formed therein and the opening extends substantially tangent to the wall.

In a further aspect of this invention, there is provided a method of limiting rejection of organic particles which pass through an opening, having an accumulator to collect inorganic particles. The opening is formed in the floor of the pulp slurry inlet chamber. An organic particle lofting fluid is introduced into the accumulator to wash organic particles up and out of the accumulator and through the opening.

The foregoing and other aspects of the invention, will become apparent by reference to the following description of embodiments of the invention, when considered in conjunction with the accompanying drawing figures.

BRIEF DESCRIPTION OF THE DRAWING FIGURES

DETAILED DESCRIPTION

Figure 1:
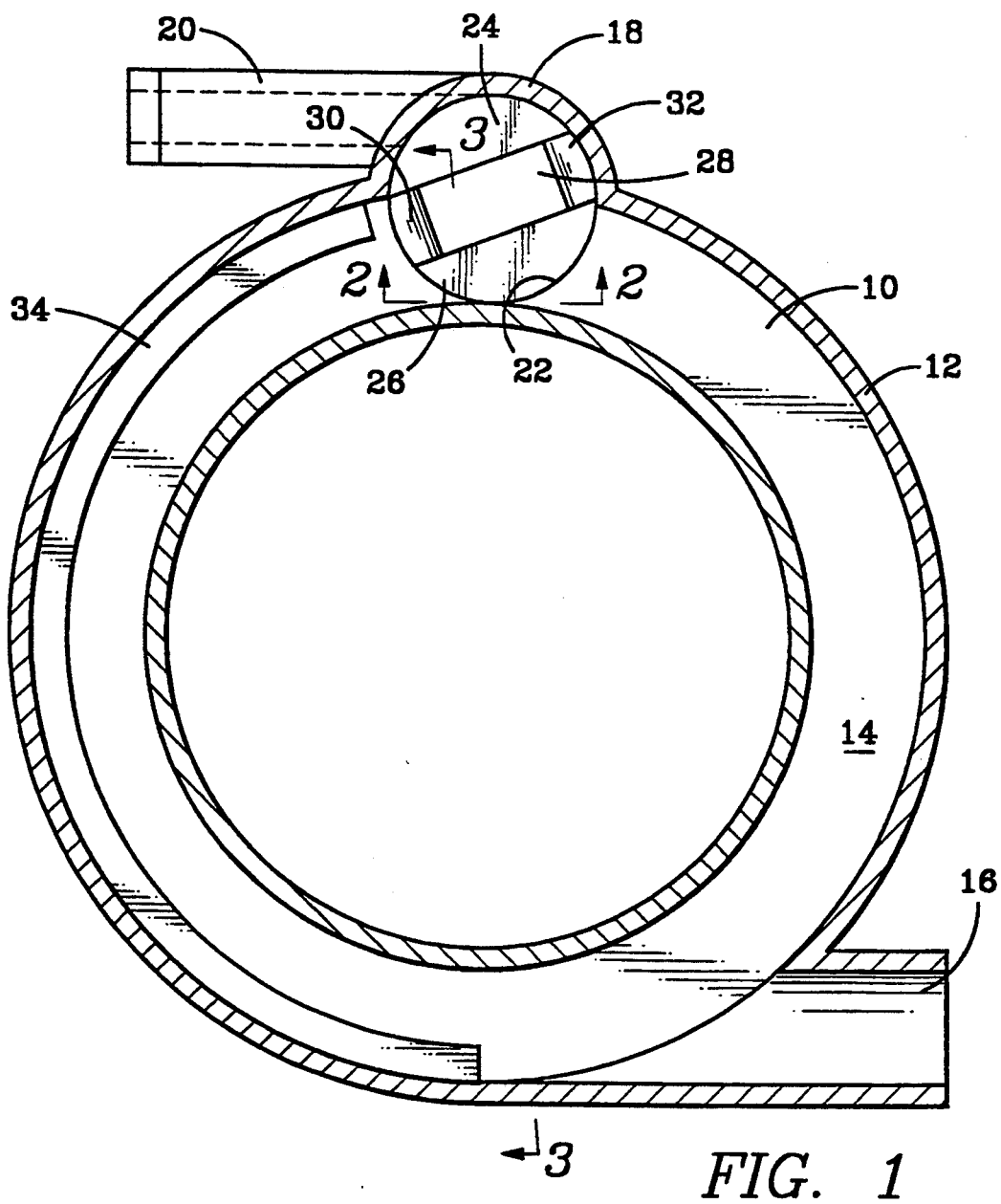
FIG. 1 is a transverse, cross-sectional view of a pulp slurry inlet chamber of a pulp handling machine, the same showing an embodiment of the junk separator operatively emplaced therein.
Figure 2:
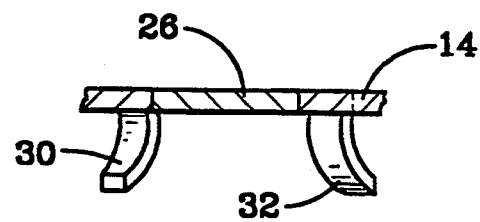
FIG. 2 is a cross-sectional view taken along section 2—2 of FIG. 1.
Figure 3:
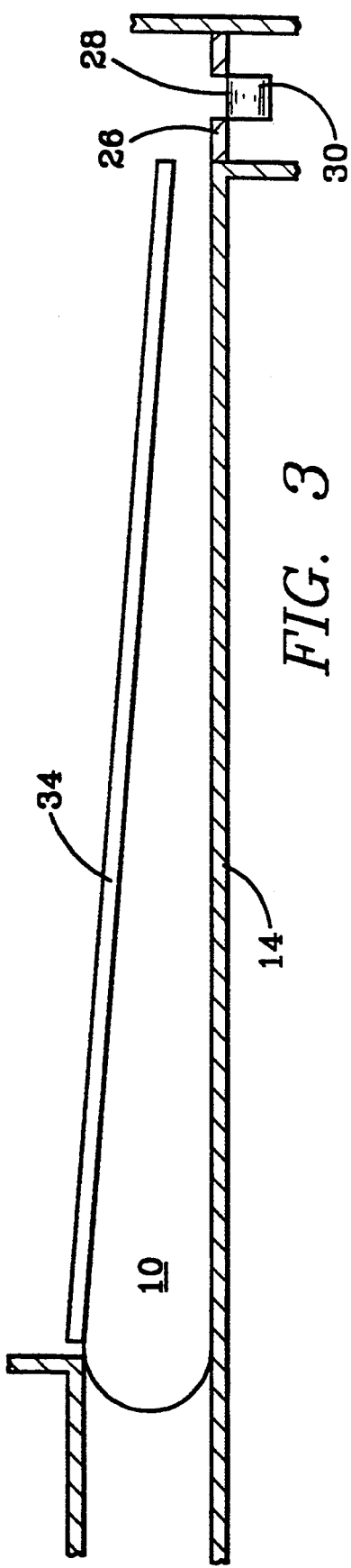
FIG. 3 is a cross-sectional view taken along section 3—3 of FIG. 1 which, however, for clarity of understanding is shown in linear development.
Figure 6:
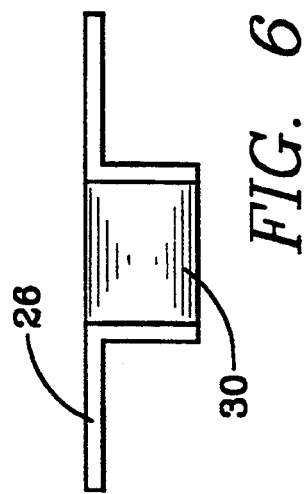
FIG. 6 is an end view of the junk separator taken from the left-hand of FIG. 5.

As shown in FIGS. 1 through 6, a circular pulp slurry inlet chamber 10, of a pulp handling machine, has an outer, peripheral wall 12, an annular bottom floor 14 and a slurry inlet conduit 16, the latter addressing the chamber tangentially. The wall 12 has an enlargement 18 formed therein, and a elutriation conduit 20 opens and accommodates elutriation liquor for admission below the floor 14. The floor 14 is imperforate, save for a single circular aperture 22 formed therein, and the novel junk separator 24 is operatively emplaced in the aperture 22. With particular reference to FIGS. 2 and 4 through 6, it will be seen that the separator 24 comprises a discrete plate 26 having an elongate opening 28 formed therein. Too, arcuate barriers 30 and 32 depend from the plate 26. The barriers 30 and 32, of arcuate conformation in cross-section, curve only inwardly relative to the opening 28.

Fixed to the wall 12, and extending from substantially the uppermost portion of the inlet conduit 16, and gradually declining to just above and in immediate adjacency to the opening 18, is a guide flight 34. The flight 34 guides the heavy, centrifugal particles, and the clearance obtaining between the downstream end thereof and the adjacent opening 18, permits largest particles to pass into the separator 24.

Figure 5:
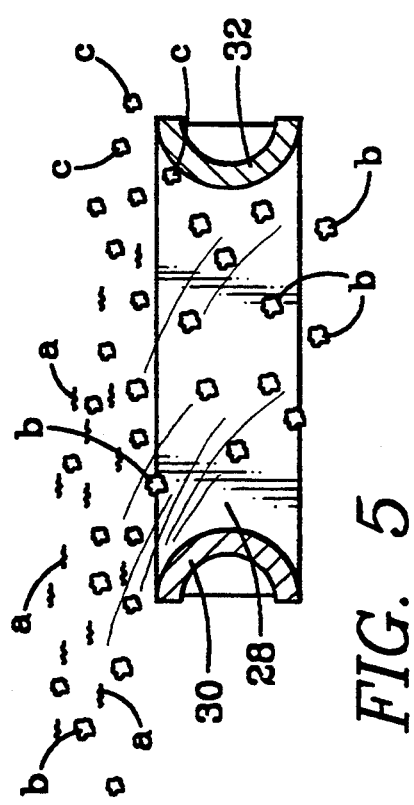
FIG. 5 is a cross-sectional view of the junk separator taken along section 5—5 of FIG. 4.

Influent pulp slurry is addressed to the chamber 10, via the conduit 16, and elutriation flow is addressed to an accumulator 36, mounted to and below the floor 14 and beneath the opening 28, via the conduit 20. In a manner well known to those skilled in this art, the slurry courses, centrifugally, through the chamber 10 and comes upon the separator 24 with its opening 28, the latter arranged substantially tangential to the wall 12. Now, the opening 28 has a predetermined length which, as represented in FIG. 5, is of minor consequence to organic fibers "a", and almost all of them simply pass over the opening 28. The length of the opening 28, however, is too great for junk "b" to bridge and, as represented in FIG. 5, it describes the short-falling trajectories shown and passes through the bottom of the opening 28. Larger organic particles, such as knots "c", enter the opening 28, but their trajectories are slightly longer than the length of the opening 28, and accordingly, they impinge on the barrier 32 and are thrown upwardly where they are caught up, again, in the slurry coursing through the chamber 10. Any organic particles which may penetrate the opening 28 due to, for example, flow irregularities, have a sink velocity which is less than the upward elutriation flow velocity (entering via conduit 20 into the accumulator 36). Consequently, the latter organic particles are washed up and out of the accumulator 36.

Figure 4:
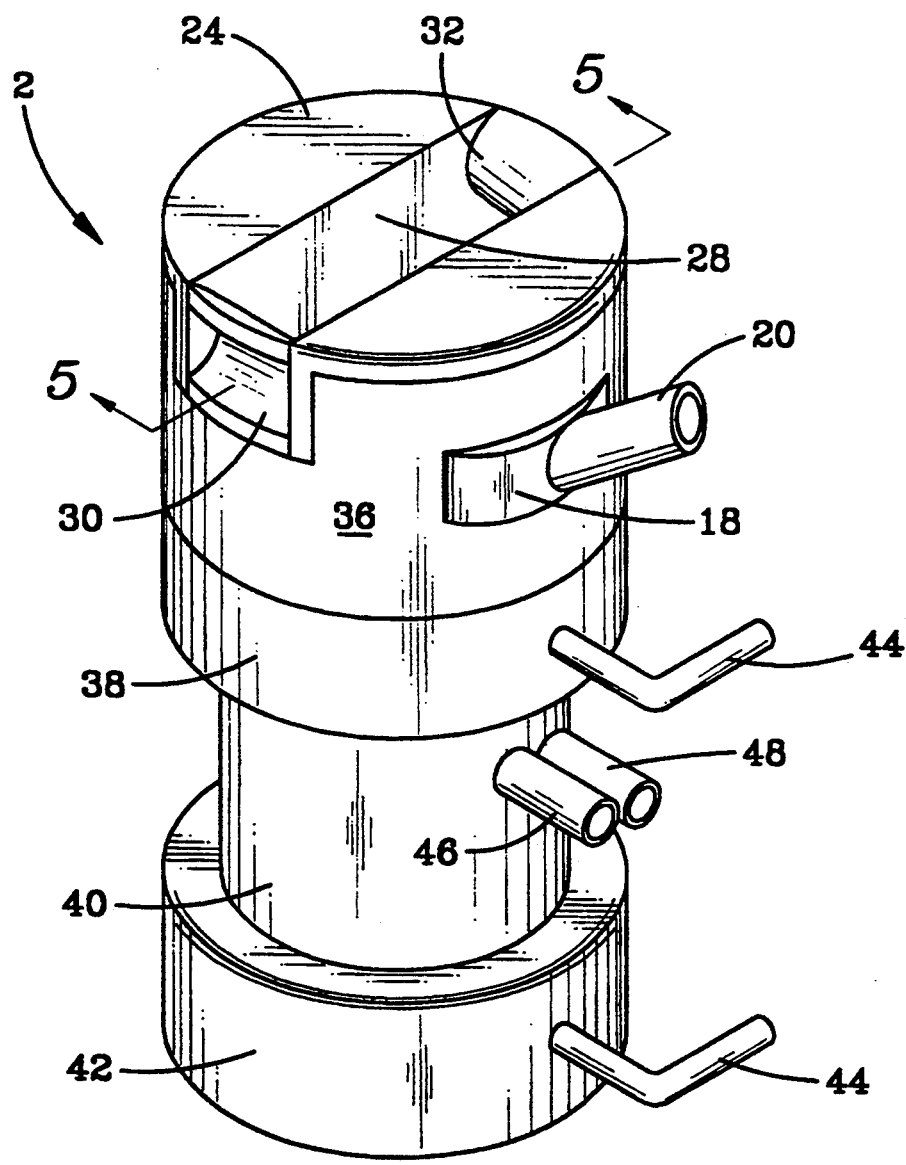
FIG. 4 is a perspective illustration of the junk separator of FIGS. 1-3 shown in combination with dump valves and an intervening junk trap.

Fixed to and below the accumulator 36, as depicted in FIG. 4, is an accumulator dump valve 38, a trap 40, and a final discharge valve 42. By way of example, the valves 38 and 42 are of a simple gate type having dump levers 44 operative thereof. The two-valve dump system is necessary to prevent loss of process liquor during the dumping operation. Additionally, means, namely piping 46 and 48, are provided for, respectively, filling and venting the trap 40 in order to prevent the introduction of air into the process liquor.

Figure 7:
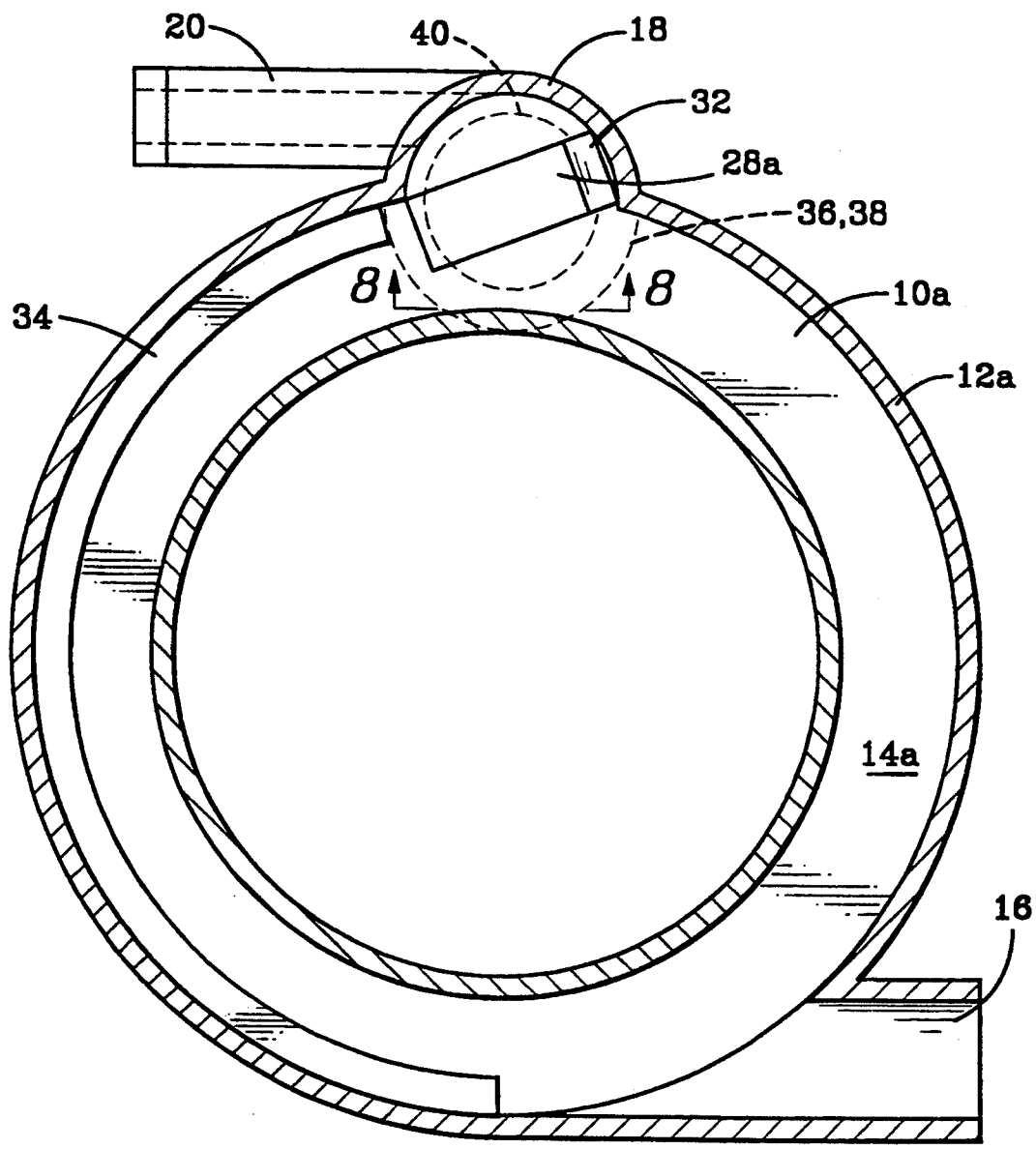
FIG. 7 is a view, similar to that of FIG. 1, depicting an alternative embodiment of the invention.
Figure 8:
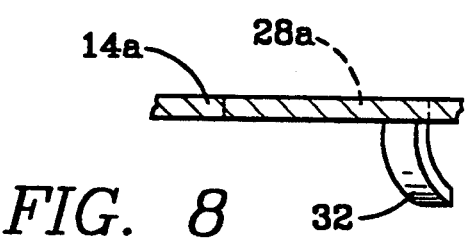
FIG. 8 is a cross-sectional view taken along section 8—8 of FIG. 7.

FIGS. 7 and 8 depict an alternative embodiment of the invention, and index numbers thereon which are the same as, or similar to those in FIGS. 1 through 6 denote same or similar components or parts.

The pulp slurry chamber 10a shown in FIG. 7 has no circular aperture 22; it simply has a rectilinear opening 28a formed therein with one of the barriers 32 depending therefrom. The same accumulator 36, accumulator valve 38, discharge valve 42, and trap 40 are coupled to the underlying surface of the floor 14a, under the opening 28a.

The instant invention pertains to a reject separator, and in particular to means for incorporation in the inlet chamber of a final stage separator for the effective separation of relatively small, inorganic particles from a liquid suspension of mainly pulp fibers and oversized, organic material, and for intermittent, separate discharge of substantially organics-free, inorganic particles.

It is a consideration of this invention that trajectories, and also gravity settling, of junk in suspension show a greater sink rate than those of organic particles. Thus, a first stage of separation of organics from organics is provided by a junk separator entrance geometry such that, at the prevailing suspension flow velocity, all inorganic, yet few organic, particles follow a trajectory that permits entry. Further, a second stage of separation is provided to return any organic particles, that may enter the junk separator entry, by an upwardly directed elutriative flow which controls the absolute sink rate of each particle.

While I have described by invention in connection with specific embodiments thereof, it is to be clearly understood that this is done only by way of example, and not as a limitation to the scope of the invention as set forth in the aspects thereof, and in the appended claims. For instance, it will become evident, from my teaching herein, that the length of the opening 28 (or 28a) can be varied, if desired, to extract different fractions. Too, the barriers 30 and 32 could be in the form of inclined, planar walls. It will be appreciated that, functionally, barrier 30, in the embodiment of the invention depicted in FIGS. 1 through 6, serves no immediate purpose. It is provided simply to accommodate a rotation of the plate 26, one hundred and eighty degrees, when and if the barrier 32 becomes unduly worn, so that barrier 30, then, can become operatively functional. Consequently, in the embodiment of FIGS. 7 and 8, only the one, functional barrier 32 is employed.

Having described the invention, what is claimed is:

1. In combination with a slurry inlet chamber of a pulp slurry handling machine, a junk separator, comprising:
    a circular slurry inlet chamber having an outer peripheral wall, an annular bottom floor, and a slurry inlet conduit; wherein said floor is imperforate, save for a single aperture formed therein; and
    a plate set in said aperture; said plate having an elongate opening formed therein and extending substantially tangent to said wall.

2. The combination of claim 1, further including:
    means coupled to said wall, and extending inwardly relative to said chamber, for guiding heavy particles from said inlet conduit to said opening.

3. The combination of claim 2, wherein said guiding means comprises a flight coupled to substantially a full half of said wall.

4. The combination of claim 3, wherein said flight arcs about said chamber from substantially said inlet conduit to substantially said opening.

5. The combination of claim 1, wherein said plate has a barrier depending therefrom at a given end of said opening.

6. The combination of claim 5, wherein said barrier is of accurate conformation in cross-section.

7. The combination of claim 6, wherein said barrier is incurvate relative to said opening.

8. The combination, according to claim 5, wherein said plate has a wall depending therefrom at an end of said opening which is opposite said given end.

9. A junk separator, for a circular pulp slurry inlet chamber of a pulp handling machine, which circular chamber has a substantially imperforate, bottom floor, comprising:
    a barrier coupled to and depending from said floor of said chamber;
    an opening, formed in said floor, and terminating at said barrier; and
    means in communication with said opening for collecting junk therein.

10. In combination with a slurry inlet chamber of a pulp slurry handling machine, a junk separator, comprising:
    a slurry inlet chamber having an outer peripheral wall, a bottom floor, and a slurry inlet conduit wherein said floor has an aperture formed therein;
    a plate set in said aperture; said plate having an elongate opening formed therein and extending substantially tangent to said wall; and
    means coupled to said wall, and extending inwardly relative to said chamber, for guiding heavy particles from said inlet conduit to said opening; said means comprising a flight extending along substantially a full half of said wall between said inlet conduit and substantially said opening; said flight being at a given elevation above said floor adjacent to said inlet conduit, and gradually declining to another elevation above said floor adjacent to said opening.

* * * * *